United States Patent Office
3,359,187
Patented Dec. 19, 1967

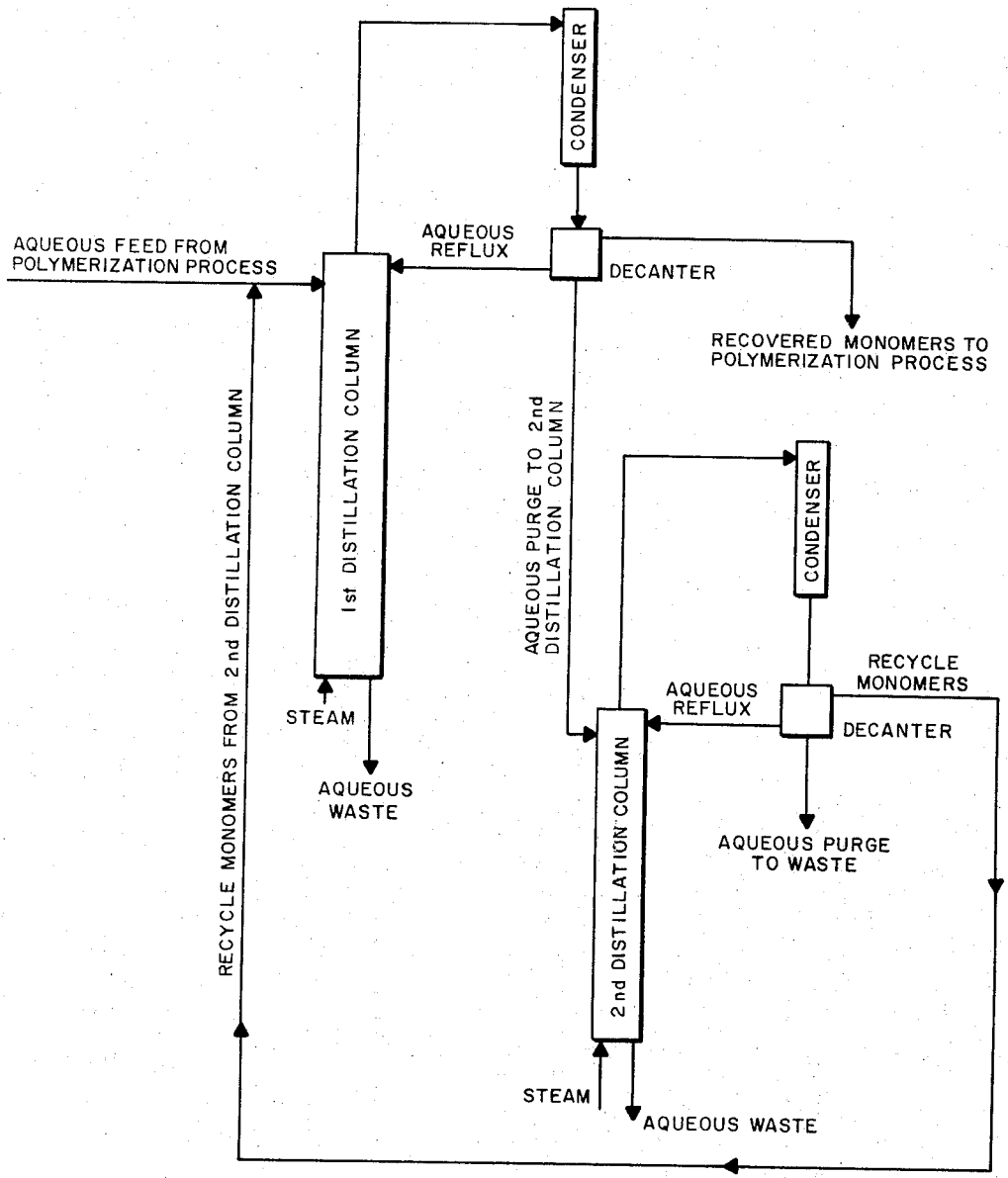

3,359,187
ACETALDEHYDE AND ACETONE QUANTITY CONTROL IN MONOMER PURIFICATION BY PLURAL DISTILLATION AND DECANTATION
Thomas M. Veazey and Wayne R. Eberhardt, Decatur, Ala., assignors to Monsanto Company, St. Louis, Mo., a corporation of Delaware
Filed Aug. 3, 1964, Ser. No. 387,222
1 Claim. (Cl. 203—41)

ABSTRACT OF THE DISCLOSURE

The purpose of the process of the present invention is to control the amount of acetaldehyde and acetone in the recovered monomers of a monomer recovery system of a terminated aqueous copolymerization reaction of vinyl monomers. The aqueous slurry resulting from the copolymerization reaction is filtered to remove the copolymer therefrom, the filtrate being distilled to provide an overhead vapor stream. The vapor stream is condensed to form a distillate which is passed to a phase separation zone where the distillate is allowed to separate into a monomer phase and an aqueous phase, the monomer phase being recycled to the copolymerization reaction. The aqueous phase is divided into two parts with one part being returned to the distillation zone as reflux and the second part being fed into a second distillation zone. The second part is distilled in the second distillation zone to provide an overhead vapor stream which is condensed to form a distillate which is then allowed to separate into a monomer phase and an aqueous phase. The monomer phase is recycled to the first distillation zone and the aqueous phase is divided into two parts—one of the two parts being returned to the second distillation zone as reflux and the other part being purged to waste. The part purged to waste will contain a major portion of the acetaldehyde and acetone originally present in the filtrate from the copolymerization reaction.

---

This invention relates to a new and improved method of purifying vinyl monomers for use in polymerization reactions and is a continuation-in-part of copending application, Ser. No. 87,762, filed Feb. 8, 1961, now abandoned.

More particularly, this invention relates to the removal of carbonyl compounds from the unreacted vinyl monomers of a shortstopped copolymerization reaction so that the unreacted monomers may be recovered in better condition for use in subsequent polymerization reactions.

One common method of producing polymer from vinyl monomers employs a redox catalyst system in which the activator is a sulfoxy reducing agent such as sodium bisulfite or sulfur dioxide. It has been found that the presence of carbonyl compounds affects the activity of such a catalyst system in a detrimental manner, and that in particular it is difficult to control the molecular weight and specific viscosity of the polymer at a constant level if the carbonyl level varies from batch to batch or, in a continuous system, varies from one time interval to another.

It appears that a complex of the aldehyde-bisulfite type or ketone-bisulfite type is formed at the expense of the sulfoxy activator, thus reducing the effective catalyst concentration and resulting in a higher specific viscosity polymer than desired.

Trace carbonyl contamination is not a major problem if the polymerization is conducted always with fresh monomer with a constant level of contamination since, for batch polymerization, the quantity of activator added to each repetitious batch can be adjusted to compensate for the known carbonyl level and, for continuous polymerization, the rate of activator addition can be similarly increased to compensate for the carbonyl compounds. However, when the polymerization is shortstopped, i.e., interrupted prior to reaction of all the monomer, and the unreacted monomers are recovered from the reaction products for use in a subsequent polymerization essentially all of the carbonyl originally present will be found in the unreacted monomer fraction. This is particularly true if the carbonyl contaminant is acetone or acetaldehyde and these two compounds are indeed the most common contaminants of typical vinyl monomers.

Thus, if 10% of the monomer remains unreacted and is subsequently recovered for reuse, there will be a tenfold increase in the concentration of the carbonyl compound in the recovered monomer as compared with the original monomer. Over a period of time, the net effect on any system employing recycle of recovered monomer into the fresh monomer feed will be a constantly increasing carbonyl concentration and an increasingly difficult problem of polymer viscosity control.

One major source of carbonyl contamination, and in particular of acetaldehyde, is the impurity present in commercial monomers. Many vinyl monomers are produced commercially by the reaction of acetylene with an appropriate substrate, an example being the addition of acetylene to hydrogen cyanide to produce acrylonitrile. As a side reaction, some of the acetylene reacts with moisture to produce acetaldehyde. Distillation techniques have proved inadequate for the total removal of acetaldehyde from acrylonitrile and all known commercial supplies of acrylonitrile contain measurable quantities of acetaldehyde.

Another source of aldehyde exists when the monomer or at least one of the monomers in a mixed monomer feed is a vinyl carboxylate. The vinyl carboxylates are susceptible to hydrolysis and are particularly sensitive to extremes of pH. The end products of the hydrolysis are acetaldehyde and an acid corresponding to the carboxylate radical originally present. Taking vinyl acetate as an example, hydrolysis occurs at a minimum rate in the pH range of 2.5 to 4.0 and is rapidly accelerated at either higher or lower pH values, the end products of the hydrolysis being equimolar quantities of acetaldehyde and acetic acid. When a sulfoxy agent capable of releasing sulfur dioxide at a low pH is employed as the activator, it may be desirable to distill the unreacted monomers from the reaction residue at a pH higher than 4 to prevent carryover of sulfur dioxide with the recovered monomer. If such conditions are used with the vinyl carboxylates, the hydrolysis rate is increased and additional acetaldehyde produced.

Carbonyl compounds may also be present from other sources and for other reasons. For example, German patent application 1,050,057 teaches the use of various aldehydes, particularly acetaldehyde, propionaldehyde, crotonaldehyde and glycolaldehyde as shortstopping agents to cause cessation for further polymerization in a reacting system. It is hypothesized that complex formation as described above accounts for the shortstopping action and that thermal dissociation of the complex under distillation conditions accounts for the essentially quantitative recovery of the aldehyde in the recovered monomer fraction.

Previously it was thought that the carbonyl content of the unreacted, recovered monomers could be controlled by treating the recovered monomers with activated charcoal; however, after treating the recovered monomers with activated charcoal and using same in a new polymerization stream, 70 percent fresh plant monomers to 30 percent recovered monomers, it was found that the specific viscosity was not lowered to the acceptable viscosity of about .26, but it actually resulted in an increase in the specific viscosity to about .4. Then the most apparent method for removing volatile carbonyl compounds from the recovered monomers, that of distillation was tried. In the fractionation, essentially all of the aldehyde was concentrated in the recovered monomer fraction. An alternative method was to discard the reflux stream in the monomer recovery system. With acetaldehyde as the major impurity it was determined that in the decanter approximately half of the aldehyde was in the monomer phase and half in the water phase. As the water phase was normally fed back to the recovery column as reflux, the aldehyde was merely being recycled. The water phase was totally discarded which resulted in a considerable reduction in the aldehyde concentration of the recovered monomers. The entire reflux was discarded and the aldehyde content of the recovered monomers was reduced to an acceptable limit. The above methods of controlling the aldehyde were very costly in that a certain amount of monomers was discarded in order to remove or lower the carbonyl content to acceptable limits. This disadvantage rendered these methods unacceptable.

An object of this invention is to provide a continuous method for the recovery of substantially pure unreacted monomers from a polymerization reaction.

An object of this invention is to provide a continuous method for the recovery of unreacted monomers in which the acetaldehyde and acetone content is within acceptable limits from a polymerization reaction.

Another object of this invention is to provide a continuous method for recovering substantially pure monomers in which only a small amount of unreacted monomer is discarded.

Other objects of this invention will be apparent to those skilled in the art from the following detailed description and the drawing in which the single figure is a schematic drawing showing the various flow streams.

The objects of the present invention are generally accomplished by a double distillation and decantation of the unreacted monomer stream which includes not only the monomer but acetaldehyde, acetone and other water soluble products and residues from the polymerization reaction in a large volume of water. This stream originates from the polymerization reaction after it has been terminated and the polymer removed by filtration and washing. This aqueous solution of unreacted monomers and impurities is first subjected to steam distillation where the monomer and its impurities are removed from the distillation column along with a roughly equal quantity of water, condensed, and sent to a decanter where the stream separates into a monomer phase and an aqueous phase. The monomer phase is recycled to the polymerization reaction. The water phase is divided into two parts, with a small portion being recycled to the first distillation column and the second part being subjected to a second steam distillation and subsequent decantation of the two phase distillate, whereupon a small amount of the aqueous layer containing a relatively large percentage of the acetaldehyde and acetone and a small amount of monomer is sent to waste, while the monomer phase is recycled back to the first column. While the present invention operates with only a two stage distillation system, a third or fourth stage could easily be added. However, additional stages do not appear to be as economical as the two stage distillation system. Also, with the decantation of the first distillate, the entire water phase could be sent to the second distillation system instead of returning a small portion to the first system.

It should, however, be pointed out that it is not the distillation which effects the separation of the carbonyl impurity from the recovered monomers and indeed it is the failure of distillation to result in an adequate separation that this invention overcomes. The distillation step above only succeeds in concentrating the volatile impurities in the monomer fraction. However, because the distillate is a two phase system, a monomer phase and a water phase, and the impurities specifically sought to be removed are soluble to a certain extent in each phase, the impurities are distributed between the two phases according to their relative solubilities therein. It is this fact that makes the operation of this invention possible. It is not necessary that there be a particularly advantageous distribution coefficient, although a disadvantageous distribution coefficient could lead to the requirement of more than two distillation-and-decantation steps to achieve a sufficiently high degree of purification.

It was determined experimentally that the distribution coefficients of two impurities of primary concern, acetaldehyde and acetone, in respect to the monomer and aqueous phase of the decanter, are as follows: acetone, 3.5 parts by weight in the monomer phase to 1 part in the aqueous phase; acetaldehyde 1.3 parts by weight in the monomer phase to 1 part in the aqueous phase. The acceptable level of acetaldehyde content in the purified and recovered monomer which is subsequently used in an additional polymerization reaction is up to and around 1 percent; that of acetone is up to and around 5 percent.

In the decanter of the first distillation, the percent concentration of the impurities, acetaldehyde and acetone, is much lower than in the decanter of the second distillation. In fact, the percent concentration of the impurities of the second distillation column is about 7 times that of the first column for the acetaldehyde and about 5 times that of the first column for the acetone. Thus the discarding of the aqueous phase purge of the second distillation column removes a much larger percentage of impurities than if the aqueous phase purge of the first column was discarded instead of passing it on to a second distillation.

In accordance with the present invention the double distillation and decantation system is employed to purify the unreacted and unrecovered monomers of the polymerization reaction of those vinyl compounds which undergo addition polymerization to form high molecular weight polymers, by which is meant that a large number of monomer molecules add onto one another to form a large molecule having a predominantly linear structure. These vinyl monomers which undergo such polymerization contain the characteristic structure $CH_2=C<$. Examples of this class of monomers include the aryl olefins such as styrene, the chlorostyrenes, p-methoxy styrene, alpha-methyl-styrene, vinyl naphthalene and the like; acrylic acid and substituted acrylic acids and their esters, nitriles and amides such as acrylic acid, methacrylic acid, methyl acrylate, ethyl acrylate, isobutyl acrylate, methyl-alpha-chloroacrylate, methyl methacrylate, ethyl methacrylate, butyl methacrylate, ethyl ethacrylate, isoamyl ethacrylate, acrylonitrile, methacrylonitrile, methacrylimide and the like; methyl isopropenyl ketone, methyl vinyl ether, vinyl ethinyl carbinol, vinylidene chloride, vinyl pyridine, vinyl acetate, vinyl chloride, vinyl furane, vinyl carbazole, fumaric acid esters, dialkyl maleate, vinyl acetylene and esters, alcohols, acids, ethers and the like of the type described.

The double distillation and decantation purification system of this invention is of excellent value in the recovery of substantially pure unreacted monomers when polymerizing a vinyl monomeric material comprising acrylonitrile with one or more other compounds containing the characteristic $CH_2=C<$ group which are copolymerizable therewith, such as, for example the aryl olefins, particularly styrene, acrylic acid and substituted acrylic acids, esters, and amides, methylisopropenyl ketone, vinyl chloride, vinylidene chloride, vinyl acetate and similar compounds, one of the copolymerizable monomers being a vinyl ester such as vinyl acetate, vinyl butyrate, vinyl valerate, vinyl pelargonate, vinyl stearate and vinyl laerate, Copolymerization of acrylonitrile and any other of the above monomers find particular application in the field of synthetic fibers when composed of at least about 80 percent by weight of acrylonitrile and up to about 20 percent by weight of one or more of the above listed vinyl monomers.

This double distillation and decantation method has been found to be effective in the recovery of substantially pure unreacted monomers of the addition polymerization reaction occurring when the vinyl polymerization materials are subjected to any of the well-known methods of polymerization which are catalyzed by a redox catalyst system; those in which a catalyst-activator system is employed containing both an oxidizing agent and a sulfoxy reducing agent in which the valence of a sulfur atom does not exceed 4. Thus, the polymerization of the above defined monomeric materials can be carried out in a heterogeneous system such as an aqueous emulsion or dispersion wherein the monomeric material is dispersed in a suitable liquid such as water, optionally with the aid of a suitable emulsifying agent, and polymerization is effected by adding the redox polymerization catalyst and activator and agitating until a polymer is formed. The double distillation purifying method of the present invention is of particular value in the recovery of substantially pure unreacted monomers of the polymerization reaction where the polymerization is conducted in a homogeneous system as by heating the monomeric material in a suitable solvent in the presence of redox polymerization catalyst-activator system.

The purification method of the present invention is applicable to the recovery of a substantially pure unreacted monomer of a batch polymerization process or a continuous polymerization process. This purification method uses the aqueous solution of unreacted monomers and impurities after the polymerization has been shortstopped and filtered. Also, this purification method is applicable to the recovery of a substantially pure unreacted monomer of a polymerization carried out in the presence of a redox catalyst system which employs as a catalyst an oxygen liberating compound of the type generally recognized as effective in vinyl polymerizations, and as an activator a water soluble oxidizable sulfoxy compound in which the valence of the sulfur atom does not exceed 4. In such redox systems, the catalyst may comprise perborates, perchlorates, persulfates, persulfuric acid and perdisulfates. Likewise, the activator may comprise inorganic oxidizable sulfoxy compounds, such as sulfur dioxide, sodium bisulfite, metabisulfite, sodium hydrosulfite and sodium thiosulfate or organic oxidizable sulfur compounds such as dialkyl sulfites, p-toluene sulfinic acid and formamidine sulfinic acids. The sulfur dioxide source which would be attacked by subsequent carryover of acetaldehyde and acetone in recovered monomers was added to the polymerization reaction initially. These sources are as described hereinbefore, any water soluble, oxidizable, sulfoxy compound in which the valence of a sulfur atom does not exceed 4, such as sulfur dioxide itself, sodium bisulfite, metabisulfite, sodium hydrosulfite, sodium thiosulfate, dialkyl sulfites, p-toluene sulfinic acids, and formamidine sulfinic acid.

In order that those skilled in the art may better understand how the present invention can be carried into effect, the following example is given by way of illustration and not by way of limitation. All parts and percentages are by weight unless otherwise stated.

*Example I*

An aqueous stream of unreacted monomers and impurities such as acetone and acetaldehyde obtained from the terminated polymerization reaction of acrylonitrile and vinyl acetate, from which the polymer has been removed by filtration and washing, was fed into the first distillation column of the recovery system. The monomers, impurities and part of the water was taken overhead by steam distillation at atmospheric pressure, condensed and passed into a decanter where the monomer and water phases were allowed to separate. The monomer phase was decanted and returned to the original polymerization system. An analysis of this recovered monomer phase disclosed 90.8 percent monomers, 2.0 percent water, 1.06 percent acetaldehyde and 3.16 percent acetone being present.

The composition of the aqueous phase was 92.2 percent water, 6.3 percent monomers, 0.4 percent acetaldehyde and 1.1 percent acetone. The aqueous phase was divided into two parts, one part being returned to the column as reflux and the other part being fed into a second distillation column, where it was steam distilled, condensed and passed into a decanter where it was allowed to separate into a monomer phase and an aqueous phase. The monomer phase was decanted and recycled to the feed of the first distillation column. The composition of this recycled monomer phase was 80.1 percent monomer, 2.0 percent water, 5.1 percent acetaldehyde and 12.8 percent acetone.

The composition of the aqueous phase of the second decantation was 86.3 percent water, 6.3 percent monomers, 2.6 percent acetaldehyde and 4.8 percent acetone. This phase was divided into parts, a large part being returned to the column as reflux and a small part being purged to waste. The aqueous purge from the second column decanter contained 6.50 times as much acetaldehyde and 4.36 times as much acetone as the first column purge. Since acetaldehyde was assigned as the controlling variable, and the second column purge rate was adjusted to maintain the 1.0 percent acetaldehyde level in the recovered monomers, the rate of purge from the second column was 1/6.5 that which would have been required from the first column to remove the same amount of acetaldehyde, and the monomer loss was correspondingly reduced 6.5 times. It is obvious that the only limitation on the process of this invention is the actual physical size of the distillation column and decanters. Large columns and decanters will be able to handle a larger stream than smaller columns and decanters. Flash evaporators may be substituted for the columns where the column separating efficiency is not required.

It has been pointed out that the present invention is particularly useful in recovering monomers from the shortstopped polymerization of vinyl carboxylates for use in a redox catalyst polymerization because (1) hydrolysis of the vinyl carboxylates is an internal and unavoidable source of aldehyde and (2) aldehyde specifically interferes with the catalytic activity of common redox systems. It will be obvious to those skilled in the art that the present invention is additionally useful whenever it is desired to remove carbonyl compounds, whatever their source, from polymerizable vinyl monomers regardless of the intended subsequent use of the monomers.

Thus this invention has resulted in a process for controlling the impurity levels in the recovered monomers and at the same time markedly reducing the amount of monomers which would have been lost in the processes of the prior art.

As many apparently widely different embodiments of this invention may be made without departing from the spirit and scope thereof, it is to be understood that the same is not to be limited to the specific embodiments thereof except as defined in the appended claim.

We claim:

The method of controlling the amount of acetaldehyde and acetone in the recovered monomers of a monomer recovery system of a terminated aqueous copolymerization reaction of vinyl monomers of a redox catalyst system in which the activator comprises a water soluble, oxidizable, sulfoxy compound in which the valence of a sulfur atom does not exceed 4; comprising filtering the aqueous slurry resulting from the copolymerization reaction to remove the copolymer therefrom; distilling the filtrate thereof in a distillation zone, thereby recovering an overhead vapor stream; condensing the vapor stream to form a distillate and passing said distillate to a phase separation zone where the distillate is allowed to separate into a monomer phase and an aqueous phase; recycling the monomer phase to the copolymerization reaction, dividing the aqueous phase into two parts, returning one part to the distillation zone as reflux, feeding the second part into a second distillation zone, distilling said second part in said second distillation zone, recovering an overhead vapor stream, condensing the vapor stream, passing the resultant distillate to a second and separate phase separation zone; allowing the distillate to separate into a monomer phase and an aqueous phase; recycling said monomer phase to the feed of the first distillation zone; dividing the aqueous phase into two parts, returning a major part to the second distillation zone as reflux and purging a minor part of said aqueous phase to waste, said minor part containing a major portion of the acetaldehyde and acetone originally present in the filtrate from the copolymerization reaction.

References Cited

UNITED STATES PATENTS

| | | | |
|---|---|---|---|
| 2,337,489 | 12/1943 | Patterson | 203—81 |
| 2,617,757 | 11/1952 | Michael | 203—53 |
| 2,871,169 | 1/1959 | Martin | 203—45 |
| 2,983,718 | 5/1961 | Wishman et al. | 260—85.5 |
| 3,002,958 | 10/1961 | Wilkinson | 260—85.5 |

WILBUR L. BASCOMB, Jr., *Primary Examiner.*

NORMAN YUDKOFF, *Examiner.*